(12) United States Patent
Staley, III et al.

(10) Patent No.: US 7,948,682 B2
(45) Date of Patent: May 24, 2011

(54) METHOD AND APPARATUS FOR COMBINING OPTICAL INFORMATION

(75) Inventors: John R. Staley, III, Dallas, TX (US); Frank C. Sulzbach, Dallas, TX (US)

(73) Assignee: Raytheon Company, Waltham, MA (US)

(*) Notice: Subject to any disclaimer, the term of this patent is extended or adjusted under 35 U.S.C. 154(b) by 557 days.

(21) Appl. No.: 10/961,790

(22) Filed: Oct. 7, 2004

(65) Prior Publication Data
US 2005/0200965 A1   Sep. 15, 2005

Related U.S. Application Data

(60) Provisional application No. 60/552,263, filed on Mar. 10, 2004.

(51) Int. Cl.
*G02B 27/14* (2006.01)
*G09G 5/00* (2006.01)
(52) U.S. Cl. ............ 359/634; 359/630; 359/638; 345/7
(58) Field of Classification Search .......... 359/630, 359/634, 638; 345/7
See application file for complete search history.

(56) References Cited

U.S. PATENT DOCUMENTS

| 5,355,224 | A | * | 10/1994 | Wallace ............... 359/631 |
| 5,914,817 | A | | 6/1999 | Browning et al. |
| 6,111,692 | A | * | 8/2000 | Sauter ............... 359/429 |
| 6,123,006 | A | | 9/2000 | Bedford et al. |
| 6,842,292 | B1 | * | 1/2005 | Sugiyama et al. ............ 359/630 |
| 2002/0181117 | A1 | | 12/2002 | Huang |

FOREIGN PATENT DOCUMENTS

| EP | 1387206 | 2/2004 |
| JP | 11 295644 | 1/2000 |

OTHER PUBLICATIONS

PCT Transmittal (Form PCT/IB/326) with PCT International Preliminary Report on Patentability (Form PCT/IB/373) and PCT Written Opinion (Form PCT/ISA/237), mailed by the International Bureau on Sep. 21, 2006 in PCT Application No. PCT/US2005/007299, 8 pages.

* cited by examiner

*Primary Examiner* — Jack Dinh
(74) *Attorney, Agent, or Firm* — Haynes and Boone LLP

(57) ABSTRACT

An apparatus includes first and second portions. The first portion has optics which cause first radiation within a selected waveband to travel along a path of travel and to have a selected field of view. The second portion introduces second radiation within the selected waveband into the field of view, without any significant degradation of a transmission efficiency of the first radiation along the path of travel. The second radiation then travels with the first radiation along the path of travel.

20 Claims, 4 Drawing Sheets

METHOD AND APPARATUS FOR COMBINING OPTICAL INFORMATION

This application claims the priority under 35 U.S.C. §119 of provisional application No. 60/552,263 filed Mar. 10, 2004.

TECHNICAL FIELD OF THE INVENTION

This invention relates in general to techniques for combining optical information and, more particularly, to techniques for combining optical information within an optical sight.

BACKGROUND OF THE INVENTION

Optical sights are used for various purposes, one example of which is mounting a sight on a weapon in order to help a user accurately aim the weapon. The optical sight takes image information from a distant scene, and presents this image information within a field of view which is visible to the eye of a user.

In some situations, it is desirable to be able to provide some supplemental information within this same field of view, such as alphanumeric information generated by circuitry within the sight. For example, the sight might include a laser rangefinder which can determine a distance to a target, and then generate alphanumeric indicia representing this distance. One possible approach for showing supplemental information of this type to a user would be to present it on a display which is physically and spatially separate from the sight's optical field of view. However, this would force the user to take his or her eye off the target or scene in order to observe the supplemental information.

A different approach would be to use an image detector to digitize the optical field of view containing information from the scene, then use a microprocessor to digitally combine this information with the supplemental information, and then display the combined information on a digital display such as a color liquid crystal display (LCD). However, existing full-color LCDs are sometimes difficult to see in direct sunlight. Further, in the event of a battery power loss, the entire sight becomes non-functional.

Still another possibility would be to use a wideband beam splitter to inject the supplemental information into the sight's optical field of view. However, this would cause a significant portion of the brightness of the sight's optical image to be lost. As a result, there would be a significant degradation in the transmission efficiency of this radiation, which in turn would significantly reduce the utility of the sight in low light conditions, such as at dawn and dusk.

SUMMARY OF THE INVENTION

One form of the invention involves causing first radiation within a selected waveband to travel along a path of travel and to have a selected field of view, while introducing second radiation within the selected waveband into the field of view without any significant degradation of a transmission efficiency of the first radiation along the path of travel, the second radiation thereafter traveling with the first radiation along the path of travel.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
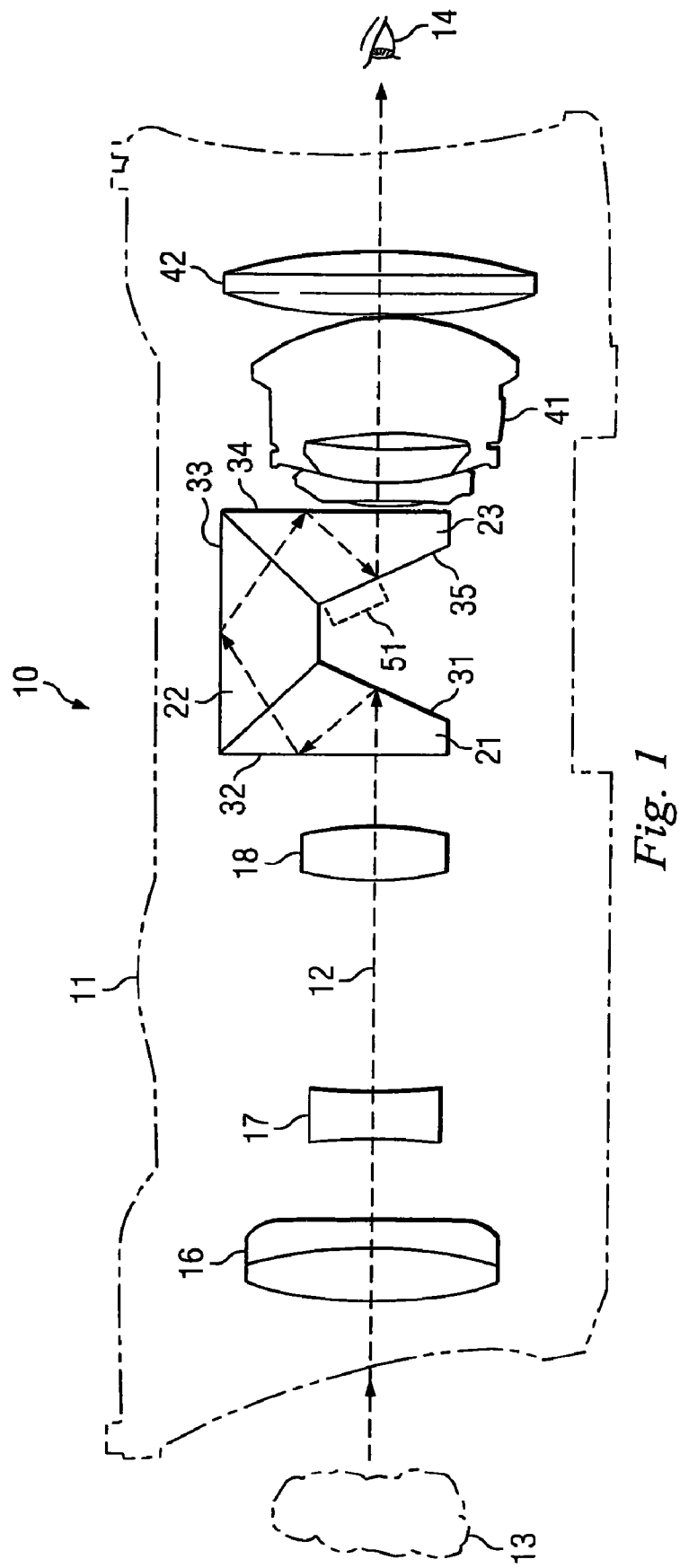
FIG. 1 is a diagrammatic view of an apparatus which is an optical sight for a weapon, and which embodies aspects of the present invention.

FIG. 1 is a diagrammatic view of an apparatus which is an optical sight 10 for a weapon, and which embodies aspects of the present invention. For example, the sight 10 could be mounted on a rifle, in order to assist a user in aiming the rifle at a target within a distant scene. FIG. 1 does not depict all of the structure of the sight 10, but only selected components which facilitate an understanding of the present invention.

The sight 10 has a housing, which is represented diagrammatically in FIG. 1 by a broken line 11. A broken line 12 represents a path of travel of visible radiation which embodies an image of a remote scene 13, the radiation traveling from the scene 13 through the sight 10 to an eye 14 of a user. The scene 13 could be any of a wide variety of different things, and is therefore depicted diagrammatically in FIG. 1 by a broken line.

The sight 10 has an objective lens doublet 16, and two removable lenses 17 and 18 that determine the magnification of the sight 10. The sight 10 also has a prism assembly which includes three prisms 21-23. The prisms 21-23 have surfaces 31-35, and each of these surfaces has at least a portion covered by a reflective coating of a type which is well known in the art. For clarity, the coatings are not separately shown in FIG. 1. Radiation from the scene 13 which is propagating along the path of travel 12 passes successively through the lens doublet 16 and the lenses 17-18, and then successively through the prisms 21-23, while being successively reflected at each of the surfaces 31-35.

The sight 10 also has a lens assembly 41, and a lens 42. After exiting the prism 23, radiation propagating along the path of travel 12 passes successively through the lens assembly 41 and lens 42, and then travels to the eye 14 of the user.

A broken line 51 diagrammatically represents a fusion section 51 of the sight 10. The fusion section 51 generates some radiation which embodies image information, and this radiation then travels along the path of travel 12 from the prism 23 through the lens assembly 41 and lens 42 to the eye 14 of the user. The purpose and function of the fusion section 51 will be explained in more detail below, with reference to FIG. 2.

Figure 2:
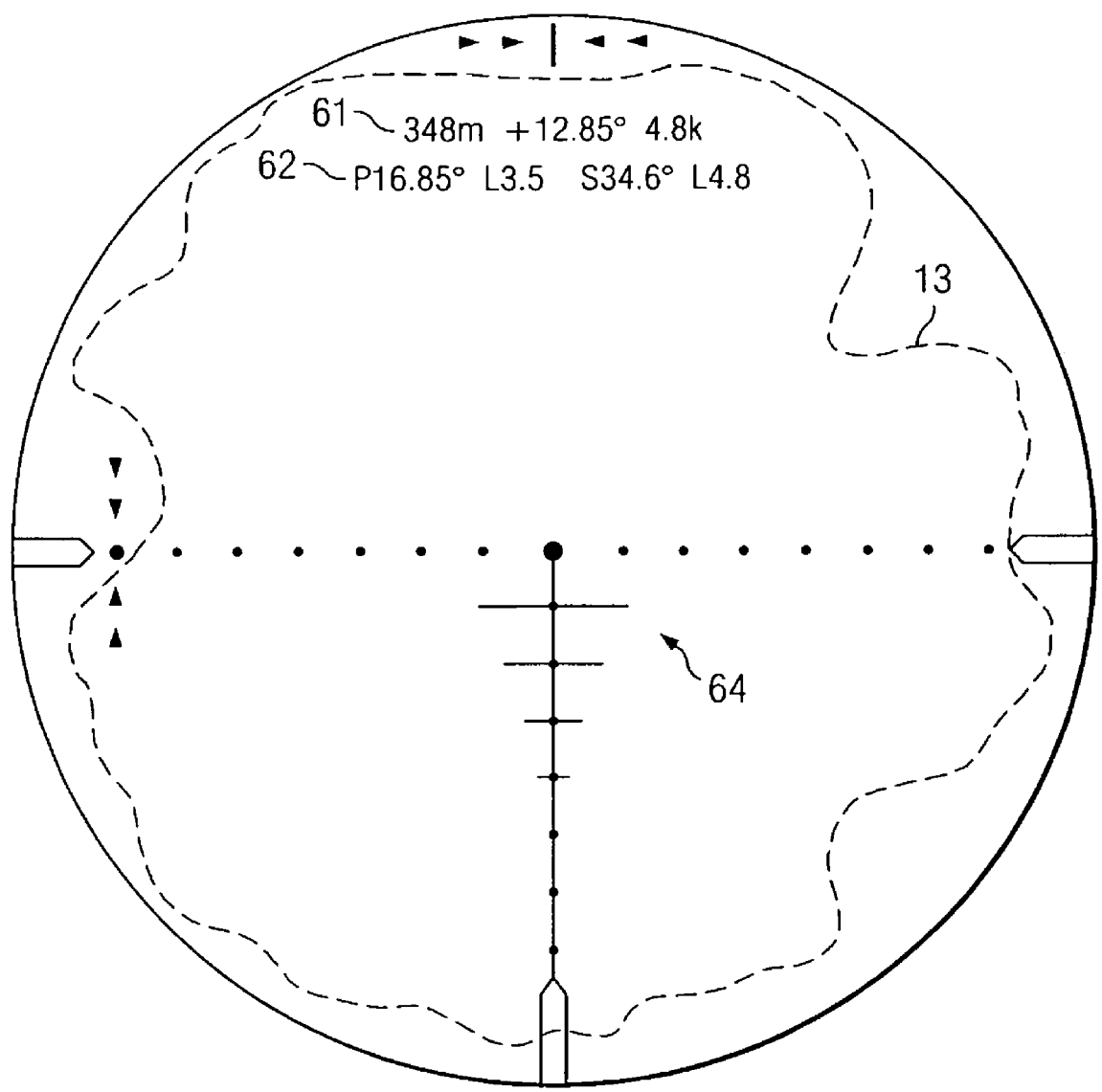
FIG. 2 is a diagrammatic depiction of a circular field of view for image information embodied in radiation which reaches an eyepiece of the sight of FIG. 1.

More specifically, FIG. 2 is a diagrammatic depiction of a circular field of view (FOV) for the image information embodied in the radiation that reaches the eye 14 along the path of travel 12. This image information includes an image of the scene 13. In addition, this image information includes two lines of alphanumeric indicia 61 and 62, which are superimposed on the image of the scene 13 by the fusion section 51 of FIG. 1, in a manner which is described in more detail later. In addition, the image information shown in FIG. 2 includes a selected reticle 64. The reticle 64 is superimposed on the image of scene 13 by the optics of the sight 10, in a manner which is known in the art and therefore not described here in detail.

Figure 3:
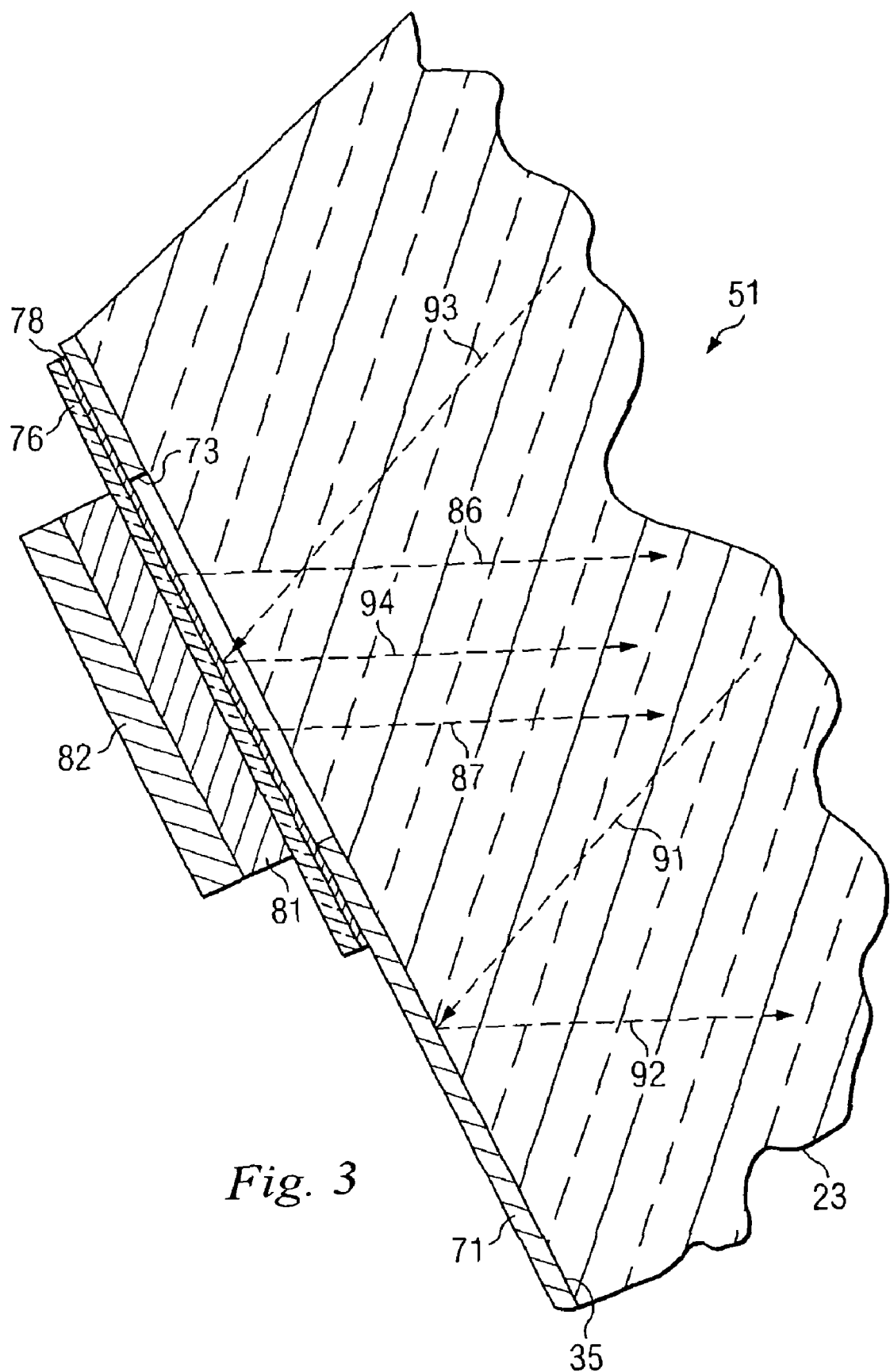
FIG. 3 is a diagrammatic fragmentary sectional side view of a portion of the sight of FIG. 1, in a significantly enlarged scale.

FIG. 3 is a diagrammatic fragmentary sectional side view of a portion of the sight 10 of FIG. 1, in a significantly enlarged scale. In particular, FIG. 3 shows the fusion section 51, and an adjacent portion of the prism 23. As mentioned earlier, the surface 35 of the prism 23 is at least partially covered by a reflective coating of a known type, and this coating is shown at 71 in FIG. 3. In the disclosed embodiment, the reflective coating 71 is a thin layer of aluminum or silver. However, it could alternatively be implemented in any other suitable manner. FIG. 3 shows an opening 73 through the coating 71. In the disclosed embodiment, the opening 73 is formed by selectively etching the coating 71, but the opening 73 could alternatively be formed in any other suitable manner.

The fusion section 51 includes a glass plate 76, which is supported adjacent the coating 71 so as to cover the entire opening 73. The fusion section 51 also includes a multi-layer thin-film filter 78, which is formed on the side of the glass plate 76 that faces the coating 71.

In more detail, in the disclosed embodiment, the filter 78 includes a plurality of thin layers of different materials, which are selected and ordered so that the filter 78 has certain specific properties with respect to radiation which impinges on the filter 78 in a specified direction. In particular, the filter 78 is transmissive to radiation having wavelengths within a narrow passband of approximately 4 nm, with a center wavelength of approximately 630 nm. The filter 78 is highly reflective to other visible radiation with wavelengths outside this passband. The passband is within the spectrum of visible light and, as seen by the human eye, is effectively one shade of red from the section of the visible spectrum that contains a variety of different shades of red. However, the invention is not limited to radiation corresponding to the color red, and the passband could alternatively be selected from some other portion of the electromagnetic spectrum. Further, although the disclosed embodiment uses a multi-layer filter of a known type, it would alternatively be possible to use any other suitable type of filter structure.

Although the disclosed embodiment has a passband with a width of 4 nm, the passband could alternatively have some other width. For example, in some applications the advantages of a relatively narrow passband such as 4 nm may justify the added manufacturing cost, whereas for other applications a wider passband such as 8 nm may be adequate, especially where it can be manufactured at a lower cost.

The following is one exemplary prescription for the specific filter 78 which is used in the disclosed embodiment, using a notation form which is well-known to those skilled in the art:

AIR 0.91227D 0.78233Q 0.18881D (0.429D 0.901Q 0.429D)11 (0.338D 0.75Q 0.358D)11 0.57796D 0.70852Q 0.3663D 1.04079D (1.09273Q 1.04079D)4 1.04079D (1.09273Q 1.04079D)9 5.20393D (1.09273Q 1.04079D)9 9.36708D (1.09273Q 1.04079D)9 5.20393D (1.09273Q 1.04079D)9 1.04079D (1.09273Q 1.04079D)4 0.31224D 1.42055Q GLASS

The foregoing prescription assumes that the prism 23 is made from a glass material having a refractive index of 1.52, and the prism is assumed to be sufficiently thick so that the opposite side of the prism can be effectively ignored. The prescription is configured for random polarization, with incidence on the filter in glass at 22.5°, and with incidence on the filter in air at 35.6° (and then exiting into the glass prism).

In the prescription, each "D" and "Q" represents a respective layer with an optical thickness of one quarterwave at normal incidence for the design wavelength of 630 nm. The number preceding each "D" or "Q" is a coefficient representing a thickness adjustment. The number after each set of parentheses represents the number of times that the layer or sequence of layers within the parentheses is repeated. When the repeated layers within all of the parentheses are expanded, the disclosed design has a total 142 layers. The "D" layers have a refractive index of 2.1 and can, for example be implemented with tantalum pentoxide. The "Q" layers have a refractive index of 1.444 and can, for example, be implemented with silicon dioxide. The exact values may vary slightly in dependence on fabrication considerations such as the method of deposition, residual gases and rates of deposition. Alternatively, other high-index coating materials could be used with similar scalable results, including niobium pentoxide, zirconium oxide, and/or titanium dioxide.

Breaking the layers of the foregoing prescription into four optically sequential groups, the layers in the following group serve to reflect blue and green light:

0.91227D 0.78233Q 0.18881D (0.429D 0.901Q 0.429D)11 (0.338D 0.75Q 0.358D)11 0.57796D 0.70852Q 0.3663D.

Next, the following layer serves as an impedance matching layer:

1.04079D.

Then, the layers in the following group serve to define the bandpass filter that passes red light at the selected 630 nm wavelength and that reflects green yellow and deep red:

| (1.09273Q 1.04079D) 9 | 1.04079D) 4 5.20393D | 1.04079D (1.09273Q | (1.09273Q 1.04079D) 9 |
|---|---|---|---|
| 9.36708D | (1.09273Q | 1.04079D) 9 | 5.20393D |
| (1.09273Q 1.04079D) 4. | 1.04079D) 9 | 1.04079D | (1.09273Q |

Finally, the layers in the following group serve as impedance matching layers:

0.31224D 1.42055Q.

If the glass material of the prism has a refractive index other than 1.52, the two groups of impedance matching layers would need slight changes. It is emphasized that the foregoing prescription for the filter 78 is merely one possible way of implementing the filter 78. The invention encompasses this approach, as well as any other suitable approach.

Still referring to FIG. 3, the fusion section 51 includes a liquid crystal display (LCD) 81, which is supported adjacent a side of the glass plate 76 opposite from the filter 78. In addition, the fusion section 51 includes a backlight 82, which is supported adjacent the side of the LCD 81 opposite from the glass plate 76. In the disclosed embodiment, the LCD 81 is a device of a known type, and has a two-dimensional array of pixels with a resolution of ¼ VGA (or in other words one-fourth as many pixels in each direction as a display conforming to the Video Graphics Array industry standard).

The LCD 81 generates an image which is the alphanumeric indicia shown at 61 and 62 in FIG. 2. In this regard, at any given point in time, the portions of the LCD 81 which correspond to displayed alphanumeric characters are transmissive to visible radiation, while other portions of the LCD 81 are opaque. The backlight 82 emits radiation with a wavelength of approximately 630 nm, and this radiation passes through the LCD 81 so that the alphanumeric image being generated by the LCD 81 becomes embedded in the radiation. This radiation then passes through the glass plate 76 and the filter 78, and into the prism 23, as indicated diagrammatically by two arrows 86 and 87 in FIG. 3.

In FIG. 3, arrow 91 represents a portion of the radiation from the scene 13, which impinges on the reflective coating 71 in a direction that forms a small angle with respect to a not-illustrated line perpendicular to the plane of the coating 71. The coating 71 is highly reflective to all radiation in the visible spectrum which impinges on it in this direction, and thus reflects substantially all of the incident energy of all wavelengths of visible light within the radiation 91, as indicated diagrammatically at 92.

Arrow 93 represents other radiation from the scene 13, which is traveling parallel to the radiation 91, and which impinges on the filter 78 rather than on the coating 71. The filter 78 is highly reflective to virtually all radiation in the visible spectrum which impinges on it in this direction, except for radiation within the filter's narrow 4 nm passband, which is centered at a wavelength of 630 nm. Consequently, as indicated diagrammatically by the arrow 94, the filter 78 reflects substantially all of the incident energy of all wavelengths of visible light within the radiation 93, with the exception of radiation having wavelengths within the 4 nm passband of approximately 628 nm to 632 nm.

Figure 4:
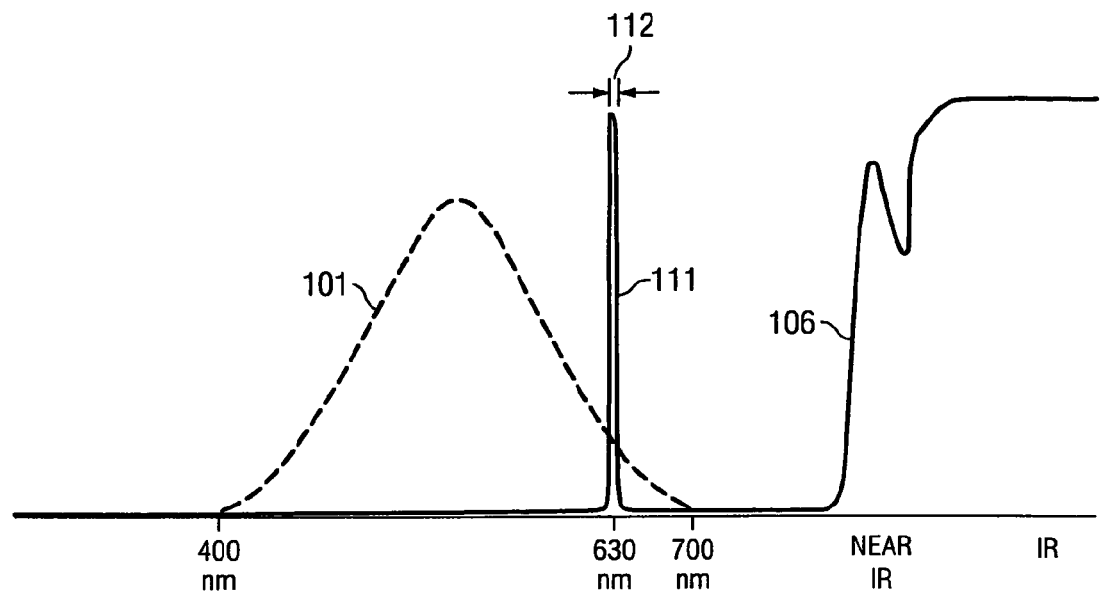
FIG. 4 is a graph depicting a curve representing a filter characteristic for a filter which is a component of the sight of FIG. 1.

FIG. 4 is a graph that helps to explain the operation of the filter 78. The horizontal axis represents wavelength, increasing from left to right. The broken line 101 represents the spectrum which is visible to the human eye, and which runs from approximately 400 nm to approximately 700 nm. The curve 106 represents the transmission characteristic of the filter 78.

In particular, it will be noted that the filter 78 is generally reflective rather than transmissive throughout the entire visible spectrum 101, except for a spike 111 that represents a high transmissivity for wavelengths within a narrow passband 112 of approximately 4 nm, which in this embodiment is centered at a wavelength of 630 nm. The filter 78 also happens to be transmissive to infrared (IR) radiation, which is permissible and does not affect the operation of the filter 78 within the visible spectrum that is of interest. In fact, partial or full IR transmissivity of the filter 78 could be advantageous in a situation where an IR laser rangefinder and/or a near IR laser pointer is incorporated into the sight 10.

Still referring to FIG. 4, it will be understood that radiation from the scene 13 which impinges on the filter 78 will virtually all be reflected, except for a very small portion thereof which falls within the passband 112. Therefore, a very small portion of the red light part of the visible spectrum will effectively be extracted out of the radiation from the scene 13 which reaches the filter 78. Of course, this is an extremely small portion of the total energy represented by the area under the curve 101 in FIG. 4. In fact, as a practical matter, the human eye 14 (FIG. 1) will be effectively unable to detect that any radiation is missing from the image of the scene 13. Stated differently, the integral of the energy under the photopic/scotopic response curve 101 less the portion of this energy which is within the passband 112 is not detectably different to a user (or at least is not distractingly different to the user) than the integral of the energy under the photopic/scotopic response curve 101. In other words, the ratio of these two values is approximately 1.

On the other hand, and as discussed above, the backlight 82 emits radiation which falls within the passband 112. Consequently, this radiation passes through the LCD 81 and the filter 78, and then in effect is optically combined with or superimposed on the visible radiation which is outside the passband 112, and which arrives at 93 and is reflected at 87.

Persons skilled in the art will recognize that the curve 106 of FIG. 4 is somewhat idealized. The curve 106 is presented in idealized form in order to easily convey an accurate understanding of the principle of the invention. Persons skilled in the art will recognize that specific implementations of the filter 78, such as the exemplary prescription discussed above, will typically have transmittance curves that approximate the idealized curve 106, but are not completely identical to it. For example, a given implementation of the filter 78 may have a transmittance for infrared radiation which is not uniform throughout the infrared spectrum, but instead varies somewhat.

In an alternative embodiment of the sight 10 of FIG. 1, which is not separately illustrated, there are three fusion sections of the type shown at 51 in FIGS. 1 and 3. In particular, radiation traveling from the scene 13 to the eye 14 is reflected successively off three surfaces, each of which is associated with a fusion section similar to the fusion section 51. These three fusion sections would differ in that each would be configured for use with a different passband.

Figure 5:
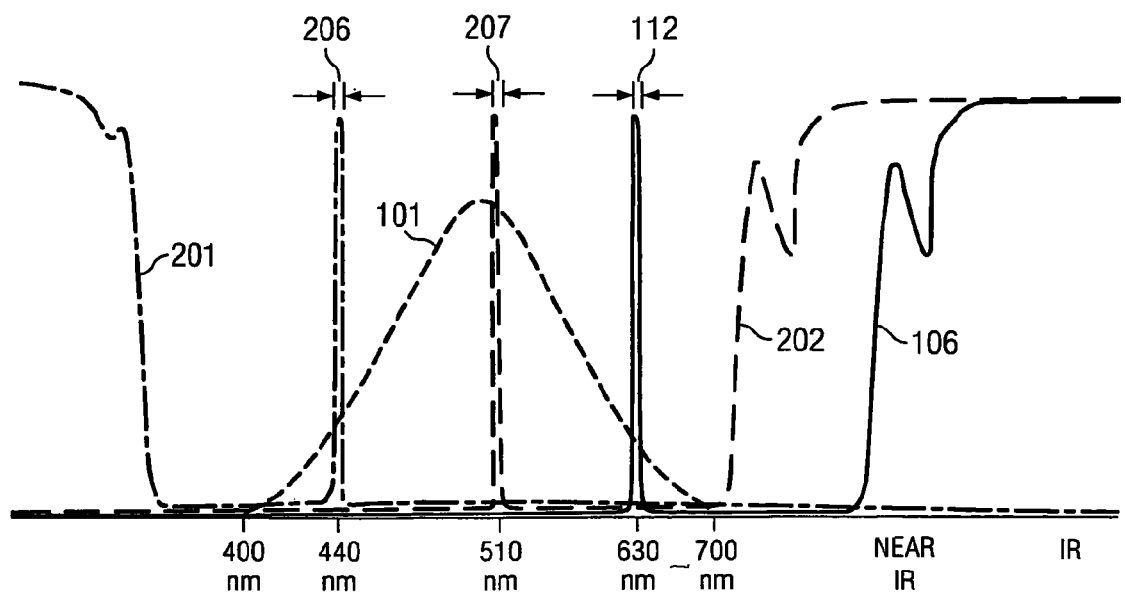
FIG. 5 is a graph for an alternative embodiment of the sight of FIG. 1, and includes a curve similar to the curve shown in FIG. 4, as well as two additional curves representing additional filter characteristics.

More specifically, FIG. 5 is a graph which includes all of the same information shown in FIG. 4, and which also has two additional curves 201 and 202. The curves 201 and 202 depict respective filter characteristics that are highly reflective to visible radiation, except within respective different passbands 206 and 207, where they are highly transmissive to visible radiation at selected wavelengths. In particular, the passband 206 has a center wavelength of approximately 440 nm, and a width of approximately 4 nm. This passband is within the spectrum of visible light and, as seen by the human eye, is effectively one shade of blue from the section of the visible spectrum that contains a variety of different shades of blue. Similarly, the passband 207 has a center wavelength of approximately 510 nm, and a width of approximately 4 nm. This passband is within the spectrum of visible light and, as seen by the human eye, is effectively one shade of green from the section of the visible spectrum that contains a variety of different shades of green. Thus, each of the three fusion sections in the alternate embodiment could superimpose information in a respective different color onto the radiation from the scene, 13.

In still another alternative embodiment, which is not separately depicted in detail, the sight 10 would include a single fusion section similar to that shown at 51 in FIG. 3. However, the filter 78 would be replaced with a filter which is configured to define two or three separate passbands at respective different wavelengths that correspond to different colors. Further, the LCD 81 would be replaced with a multi-color LCD that can produce two or three colors of radiation which each fall within a respective one of the passbands of the filter. As still another alternative, the LCD 81 and backlight 82 of FIG. 1 could both be replaced with a light emitting diode (LED) display, which could be a single color display in the case of a filter with a single passband, or which would be a multi-color LED display in the case of a filter with two or more distinct passbands.

The disclosed embodiments permit radiation at one or more specific wavelengths to be efficiently combined with or superimposed on other radiation, such as that from a scene, without substantially degrading the overall transmission efficiency of the latter. This allows the optical sight to be readily used when the display is off or when a battery for operating the display is discharged, or in low light situations such as at dawn or dusk. By effectively wavelength division multiplexing supplemental information into the field of view, the efficiency of obtaining sufficient contrast of the supplemental information relative to the sight's field of view is maximized, thereby lowering the necessary emission brightness of the light source which generates the supplemental information, and thus the power requirements of that light source, which in turn maximizes battery life in portable configurations.

Although selected embodiments have been illustrated and described in detail, it will be understood that various substitutions and alterations are possible without departing from the spirit and scope of the invention, as defined by the following claims.

What is claimed is:

1. An apparatus comprising:
a first portion having optics configured to route a selected waveband of radiation along a path of travel passing successively through spaced first, second and third locations with a selected field of view, said optics causing first radiation within said selected waveband to travel from said first location to said third location along said path of travel within said selected field of view; and
a second portion including a filtering structure, transmissive to radiation within a passband, disposed along said path of travel and a radiation generator which emits second radiation within said selected waveband, wherein said filtering structure introduces said second radiation, which falls within the passband, into said field of view at said second location and reflects said first radiation, except for a portion of the first radiation that falls within the passband, said second radiation thereafter traveling with said first radiation, less the portion that fell within the passband, from said second location to said third location along said path of travel.

2. An apparatus according to claim 1, wherein said second radiation has a further field of view which is a portion of and substantially smaller than said selected field of view.

3. An apparatus according to claim 1, wherein said second radiation is within a further waveband which is a portion of and substantially smaller than said selected waveband.

4. An apparatus according to claim 3, wherein
the radiation generator is disposed on an opposite side of said filtering structure from said path of travel.

5. An apparatus according to claim 4, wherein said radiation generator includes an image generator which emits said second radiation.

6. An apparatus according to claim 5,
wherein said filtering structure includes a transmissive plate having thereon a multi-layer filter which is transmissive to the radiation within the passband and reflective of radiation outside of the passband; and
wherein said image generator includes a backlight, and a liquid crystal display disposed between said plate and said backlight.

7. An apparatus according to claim 1, wherein said first radiation embodies first image information, and said second radiation embodies second image information different from said first image information.

8. An apparatus according to claim 7, wherein said first image information includes an image of a scene external to said apparatus, and said second image information includes alphanumeric indicia.

9. An apparatus according to claim 1, wherein said filtering structure introduces third radiation within said selected waveband into said field of view, said third radiation thereafter traveling with said first radiation along said path of travel.

10. An apparatus according to claim 9,
wherein said second radiation is within a first waveband within the passband which is a portion of and substantially smaller than said selected waveband; and
wherein said third radiation is within a second waveband within the passband and is different from said first waveband.

11. An apparatus according to claim 1,
including a weapon sight, said first and second portions being respective parts of said weapon sight; and
wherein radiation within said selected waveband is visible light.

12. An apparatus comprising:
a first portion having optics which cause first radiation within a selected waveband to travel along a path of travel and to have a selected field of view; and
a second portion which introduces second radiation within said selected waveband into said field of view, said second radiation thereafter traveling with said first radiation along said path of travel;
wherein said second portion includes a filtering structure which is disposed along said path of travel, which is transmissive to radiation within a passband, and which reflects selected radiation that is within said selected waveband and outside said passband;
wherein said second radiation is within the passband which is a portion of and smaller than said selected waveband;
wherein said second portion includes a radiation generator which is disposed on an opposite side of said filtering structure from said path of travel, and which causes said second radiation to pass through said filtering structure;
wherein said a radiation generator includes an image generator which emits said second radiation;
wherein said filtering structure includes a transmissive plate having thereon a multi-layer filter which is transmissive to radiation within said passband and reflective to radiation within said selected waveband and outside said passband;
wherein said image generator includes a backlight, and a liquid crystal display disposed between said plate and said backlight; and
wherein said optics include a prism having on one side thereof a reflective coating with an opening therein, said plate being disposed adjacent said coating on a side thereof opposite from said prism.

13. An apparatus comprising:
first means configured for routing a selected waveband of radiation along a path of travel passing successively through spaced first, second and third locations with a selected field of view, said first means causing first radiation within said selected waveband to travel from said first location to said third location along said path of travel within said selected field of view; and
second means for generating second radiation within said selected waveband;
third means disposed along said path of travel for transmitting radiation within a passband and for reflecting selected radiation that is within said selected waveband and outside said passband, wherein the third means introduces said second radiation, which falls within the passband, into said field of view at said second location, said second radiation thereafter traveling with said first radiation, less a portion that falls within the passband, from said second location to said third location along said path of travel.

14. An apparatus according to claim 13, wherein said second means includes means for introducing third radiation within said selected waveband into said field of view along said path of travel, said third radiation thereafter traveling with said first radiation, less a portion that falls within the passband, along said path of travel.

15. A method comprising:
- configuring optics to route a selected waveband of radiation along a path of travel passing successively through spaced first, second and third locations with a selected field of view;
- causing first radiation within said selected waveband to be directed by said optics from said first location to said third location along said path of travel within said selected field of view;
- generating second radiation within said selected waveband; and
- introducing, via a filtering structure transmissive to radiation within a passband, said second radiation, which falls within said passband, into said field of view at said second location, and
- reflecting at said second location, via the filtering structure, said first radiation, except for a portion of the first radiation that falls within the passband, said second radiation thereafter traveling with said first radiation, less the portion that fell within the passband, from said second location to said third location along said path of travel.

16. A method according to claim 15, including selecting said second radiation to have a further field of view which is a portion of and substantially smaller than said selected field of view.

17. A method according to claim 15, including configuring said first radiation to embody first image information and said second radiation to embody second image information different from said first image information.

18. A method according to claim 17, including:
- selecting said first image information to include an image of a scene external to said apparatus, and
- selecting said second image information to include alphanumeric indicia.

19. A method according to claim 15, including introducing via the filtering structure, a third radiation within said selected waveband and within said passband, into said field of view, said third radiation thereafter traveling with said first radiation, less the portion of the first radiation that fell within the passband, along said path of travel.

20. A method according to claim 19, including:
- selecting said second radiation to be within a first waveband which is a portion of and substantially smaller than said selected waveband; and
- selecting said third radiation to be within second waveband which is a portion of and substantially smaller than said selected waveband, and which is different from said first waveband.

* * * * *